United States Patent
> Arnold

[15] 3,672,039
[45] June 27, 1972

[54] METHOD FOR INSERTING INSULATORS AND COIL TURNS INTO THE SLOTS OF A MAGNETIC CORE

[72] Inventor: Richard B. Arnold, Fort Wayne, Ind.
[73] Assignee: General Electric Company
[22] Filed: May 6, 1970
[21] Appl. No.: 35,175

Related U.S. Application Data

[60] Division of Ser. No. 875,895, Nov. 12, 1969, which is a continuation-in-part of Ser. No. 748,405, July 29, 1968, abandoned.

[52] U.S. Cl. ................................29/596, 29/205 R, 29/606
[51] Int. Cl. ......................................................H02k 15/00
[58] Field of Search ...................29/596, 606, 205; 140/92.1, 140/92.2

[56] References Cited

UNITED STATES PATENTS

| 2,934,099 | 4/1960 | Mason | 140/92.1 |
| 3,402,462 | 9/1968 | Walker et al. | 29/596 |
| 3,447,225 | 6/1969 | Eminger | 29/205 |
| 3,528,170 | 9/1970 | Duff et al. | 29/596 |

Primary Examiner—John F. Campbell
Assistant Examiner—Carl E. Hall
Attorney—John M. Stoudt, Radford M. Reams, Ralph E. Krisher, Jr., Frank L. Neuhauser and Oscar B. Waddell

[57] ABSTRACT

Method for concurrently inserting insulators and side turn portions of an electrical coil into selected axially extended slots of a magnetic core. For inserting the insulators into the slots, insulator pushers are slidably disposed in guide apertures of the apparatus. The side turn portions of the electrical coil are inserted into the axially extending slots by a preselected number of coil turn feeder blades movably supported relative to a divider blade section. The divider blade section and coil turn feeder blades define a series of turn-receiving gaps in which the electrical coil is carried.

A driver actuated by a suitable power source effects a movement of the insulator purshers in an axial direction continuously through a first, second and a third increment of travel to effect placement of the insulators in the slots. The divider blade section and the coil turn feeder blades are conjointly actuated in an axial direction during the second increment of travel. Upon completion of the second increment of travel the divider blade section and coil turn feeder blades are extracted and extend through the bore of the magnetic core. During the third increment of travel of the driver, only the insulator pushers and the coil turn feeder blades are actuated in an axial direction, and upon completion of the third increment of travel the side turn portions of the electrical coil are inserted into predetermined pairs of slots. Movement of the coil turn feeder blades relative to the divider blade section materially reduces the frictional drag on the coils during insertion. Preferably, the coil turn feeder blades are formed with reduced portions terminating in a pair of turn-pushing ledges, and the turn-receiving gaps are defined by the walls of the reduced portions and adjacent walls of the divider blade section. Also, the travel of the driver through the third increment of its travel is resiliently cushioned as the insulator pushers and coil turn feeder blades are driven to the fully extended position.

Also, the ledges may terminate short of the peripheral edges of the feeder blades, and the feeder blades include shoulders axially recessed from the ledges. With this arrangement the gaps form extensions of the slot entrances to receive some of the side turn portions as other side turn portions are inserted into predetermined slots. The shoulders thereafter effect insertion of the side turn portions first received in the slot entrance extensions.

The method can be beneficially practiced to insert side turn portions of an electrical coil group even when insulators are not being inserted.

With this arrangement it is possible to accommodate magnetic cores of different stack heights with relatively minor adjustments and to insert mechanically loaded insulators into magnetic cores having relatively small diameter bores. The coil turn feeder blades and divider blade section form a rigid structure for precisely controlling the insertion of the coil side turn portions thereby minimizing a possibility of damage to the conductor wire during the insertion process.

11 Claims, 17 Drawing Figures

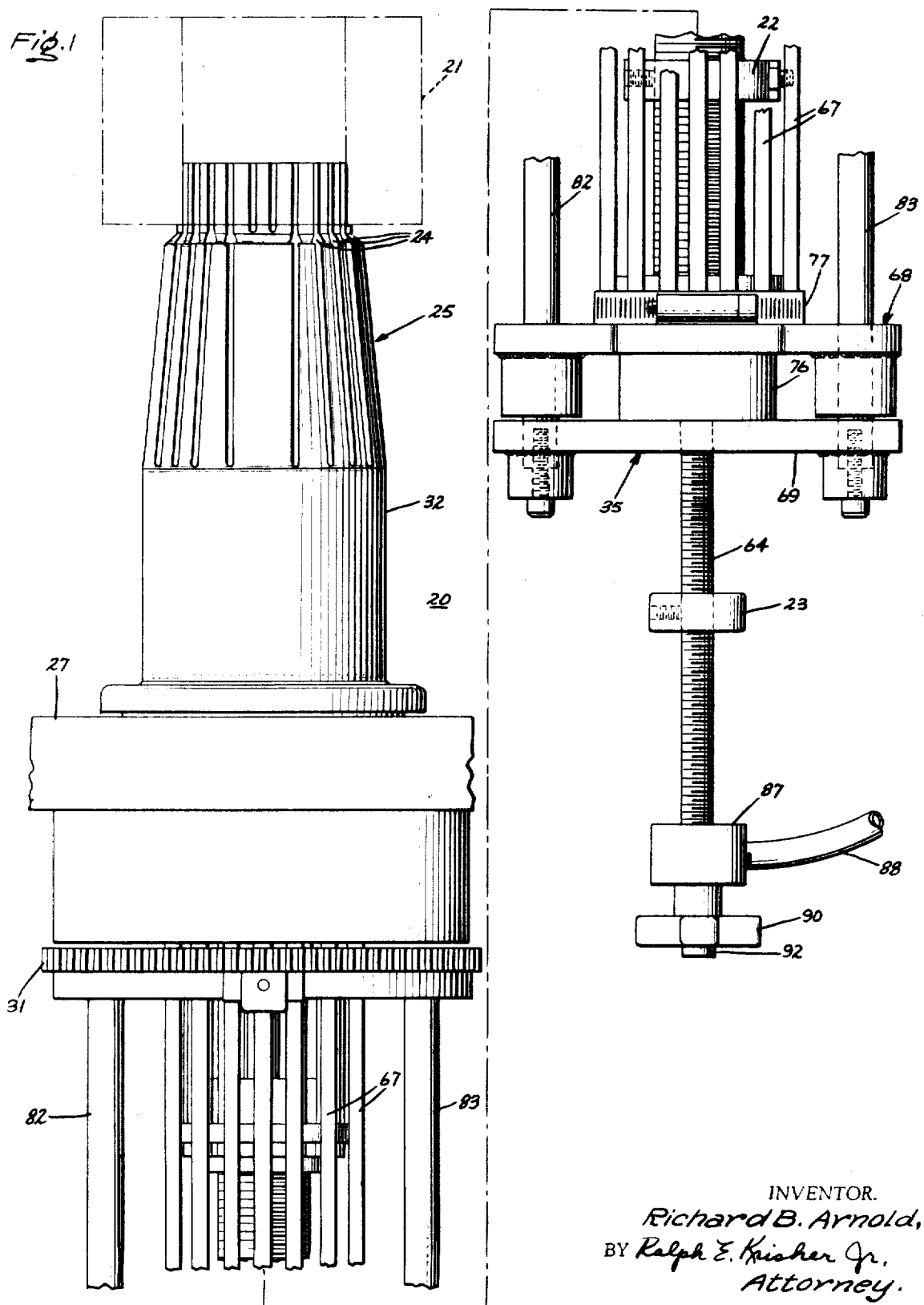

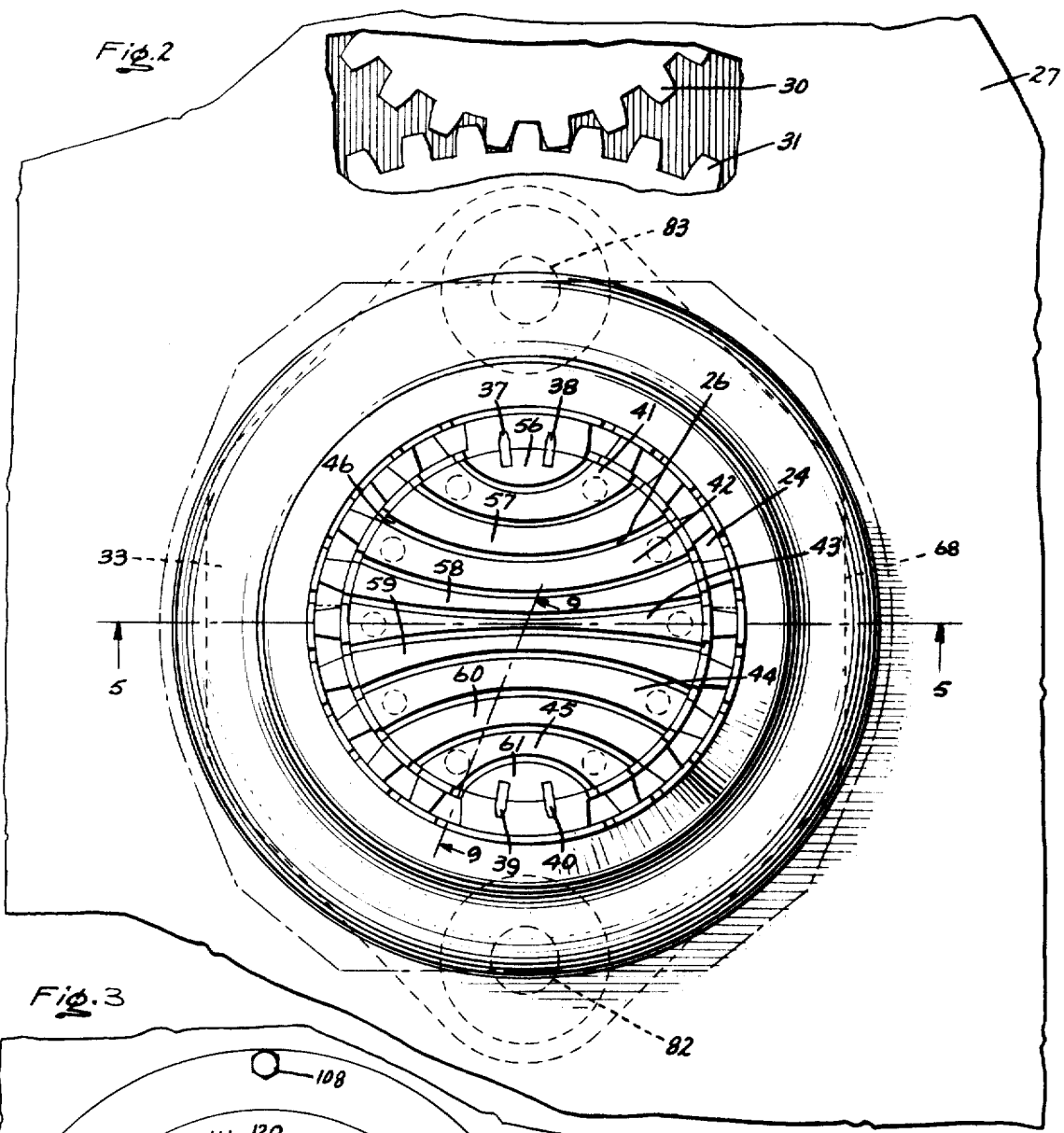
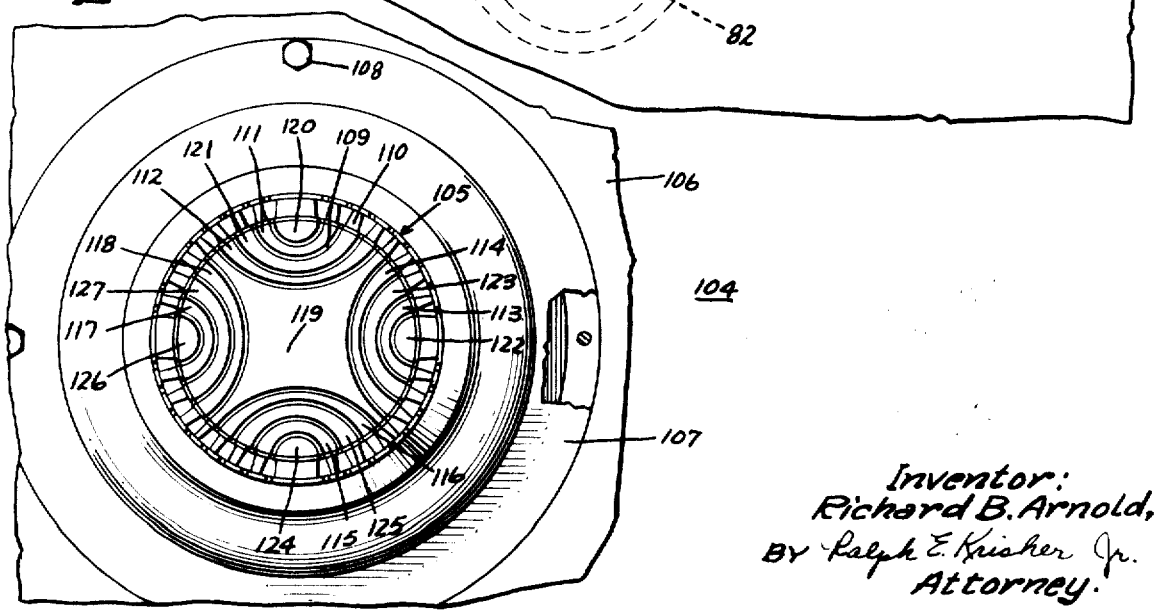

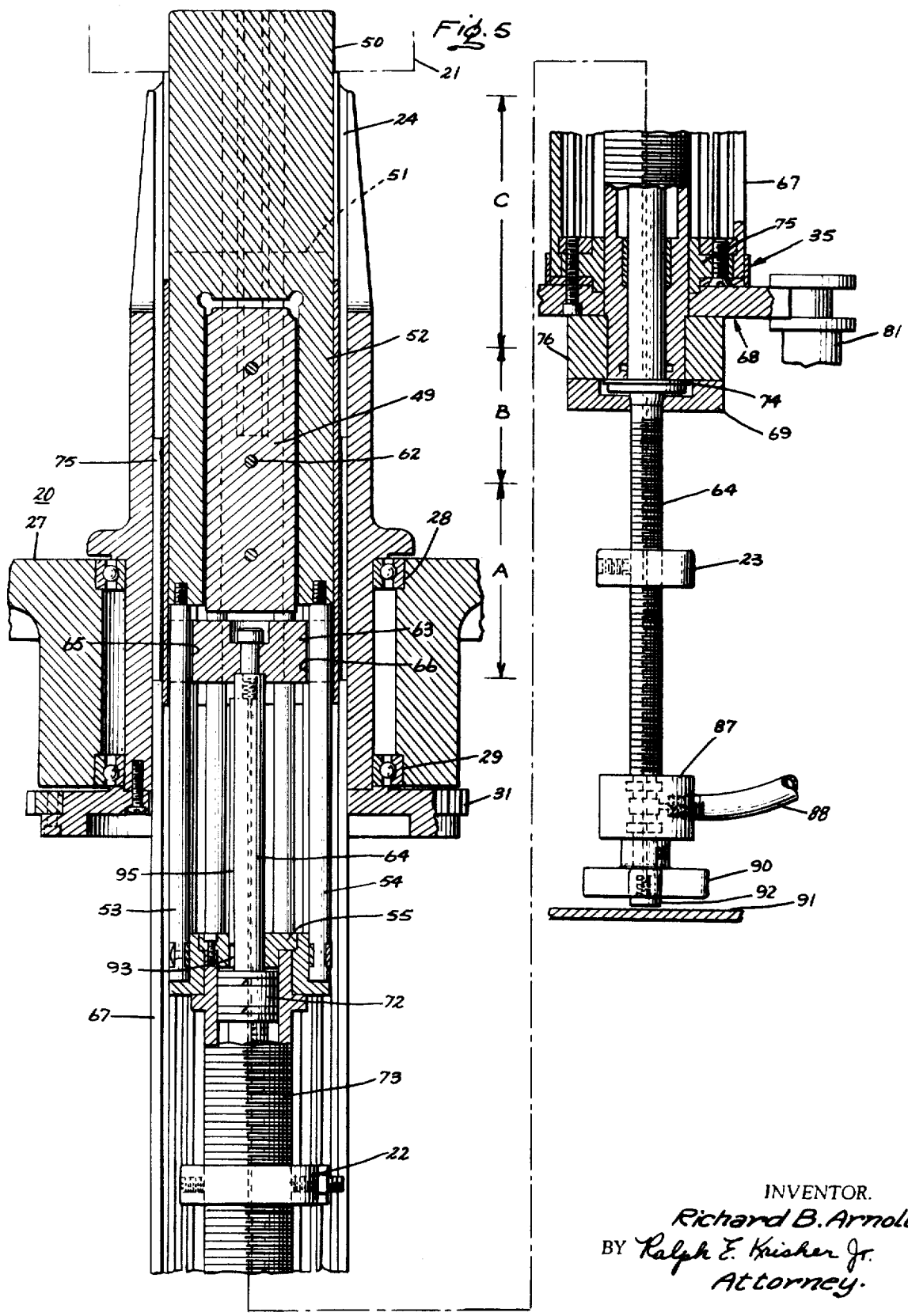

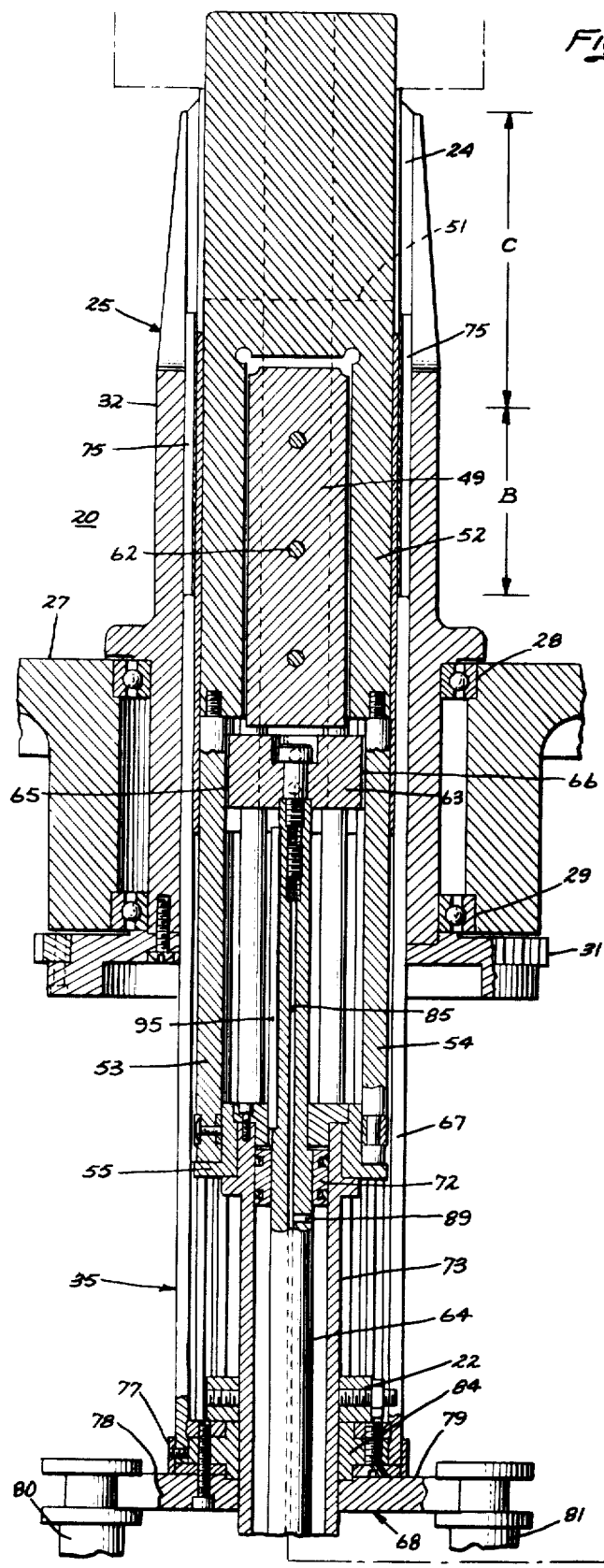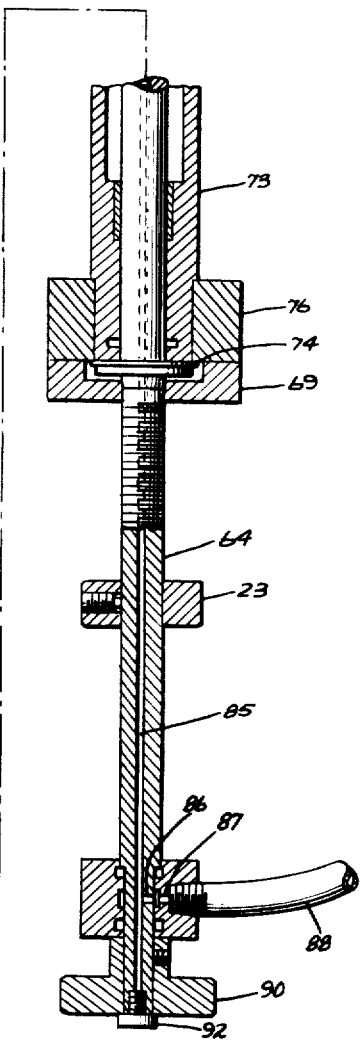

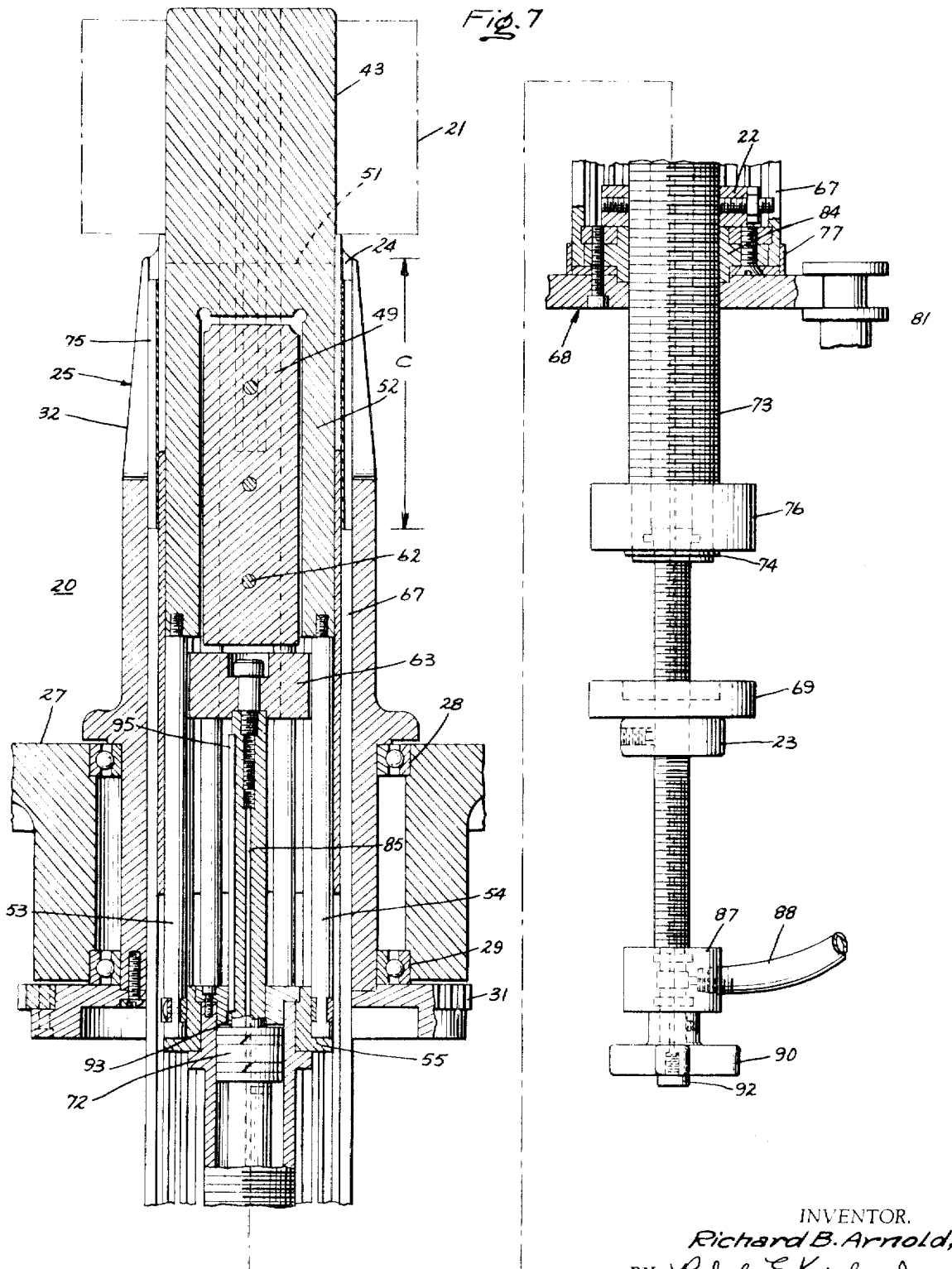

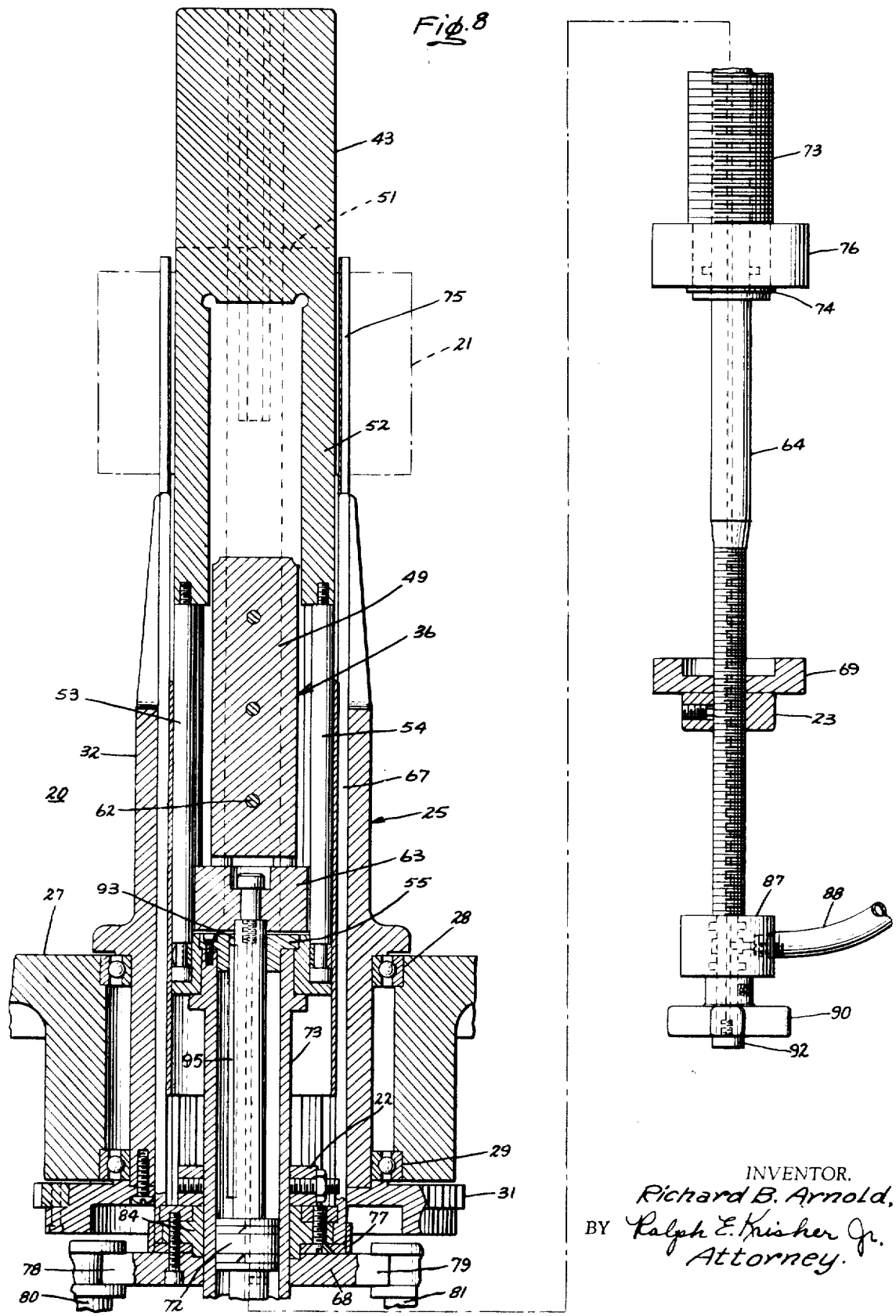

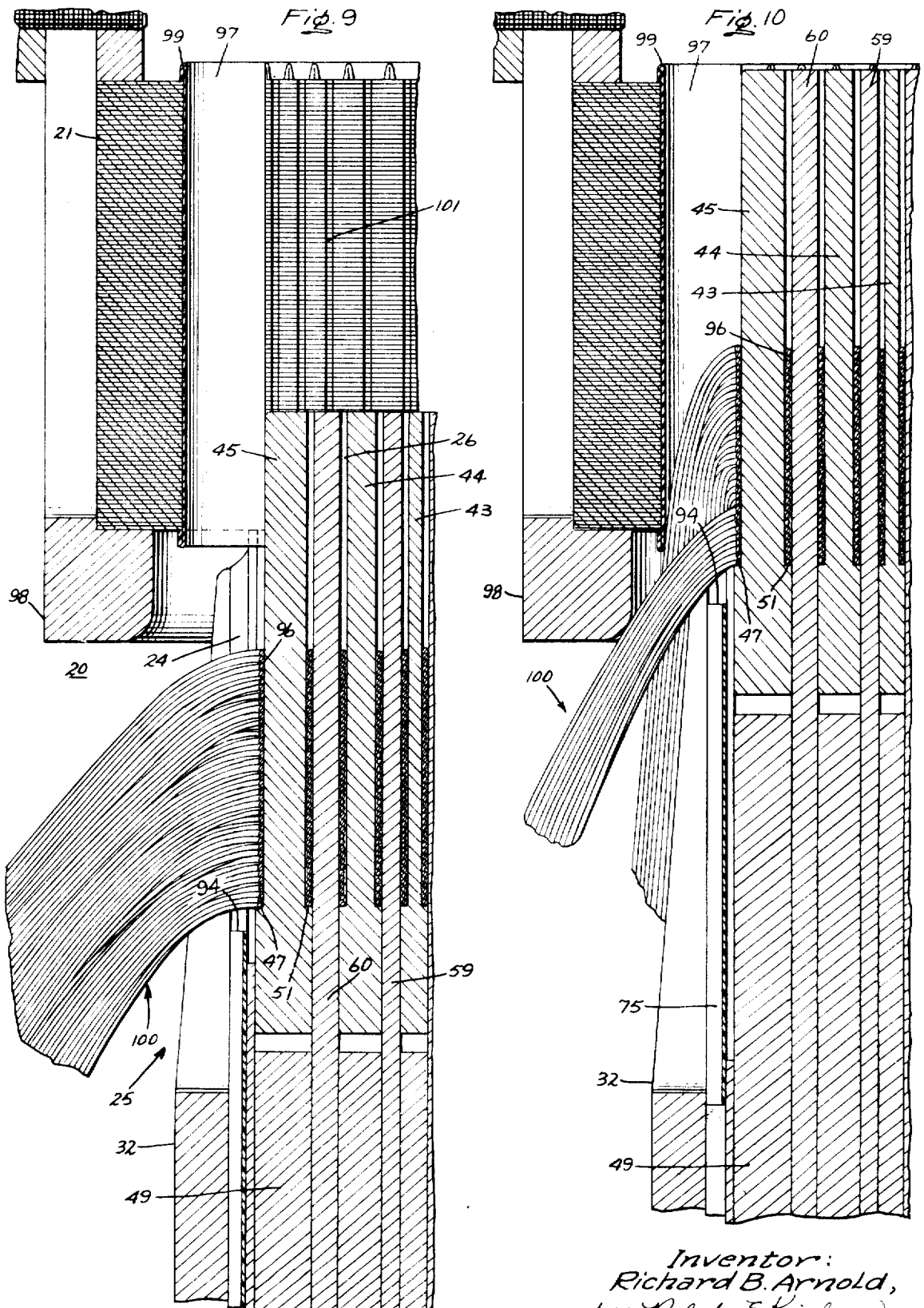

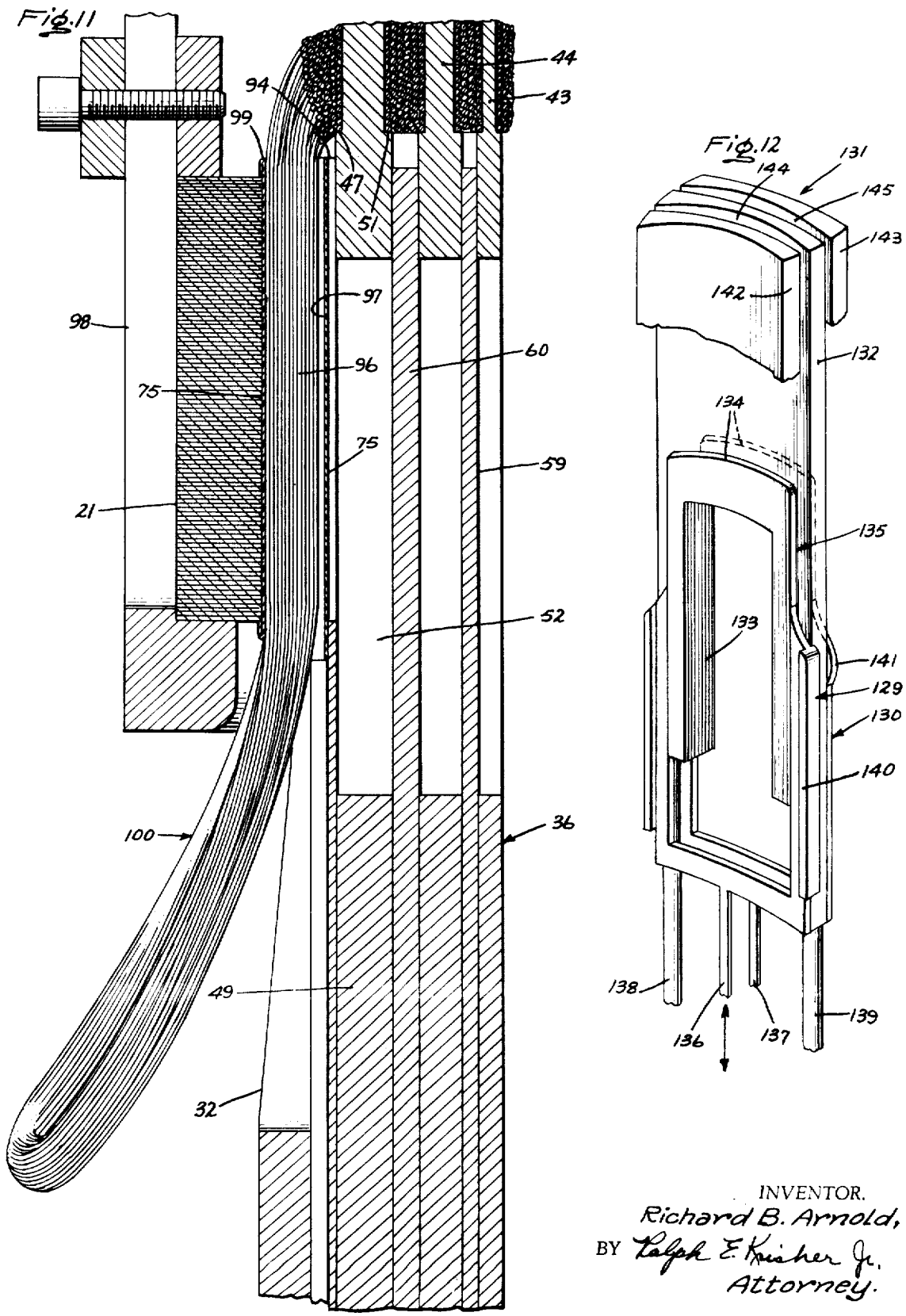

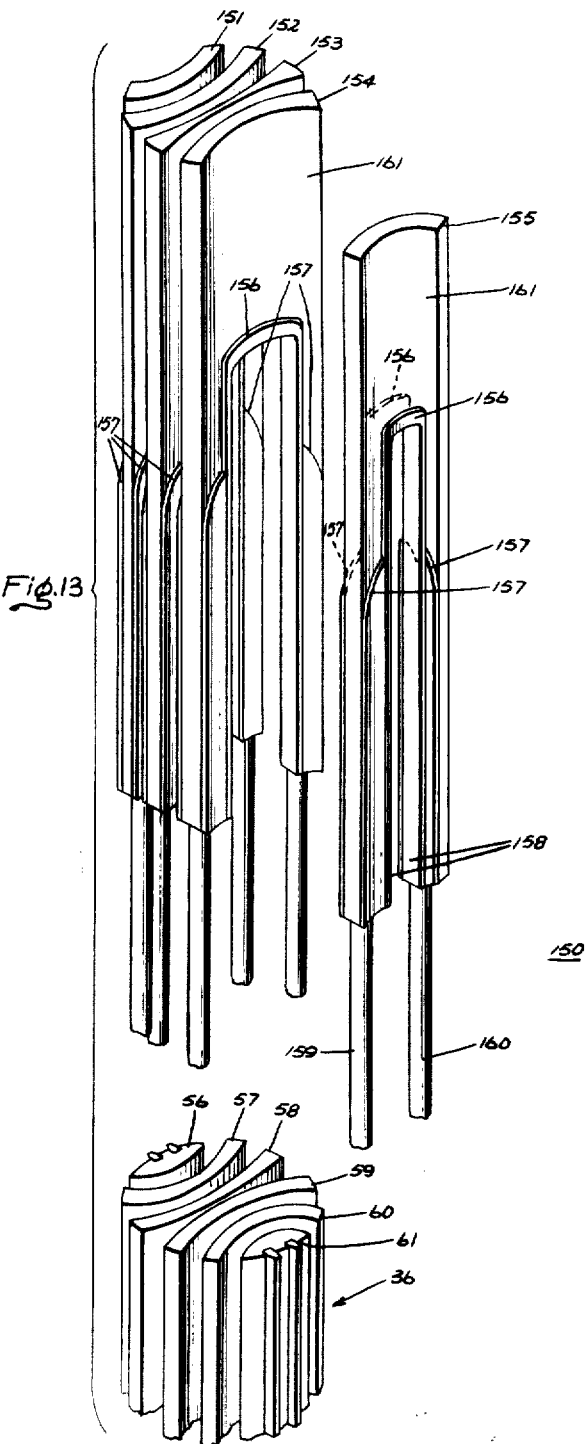

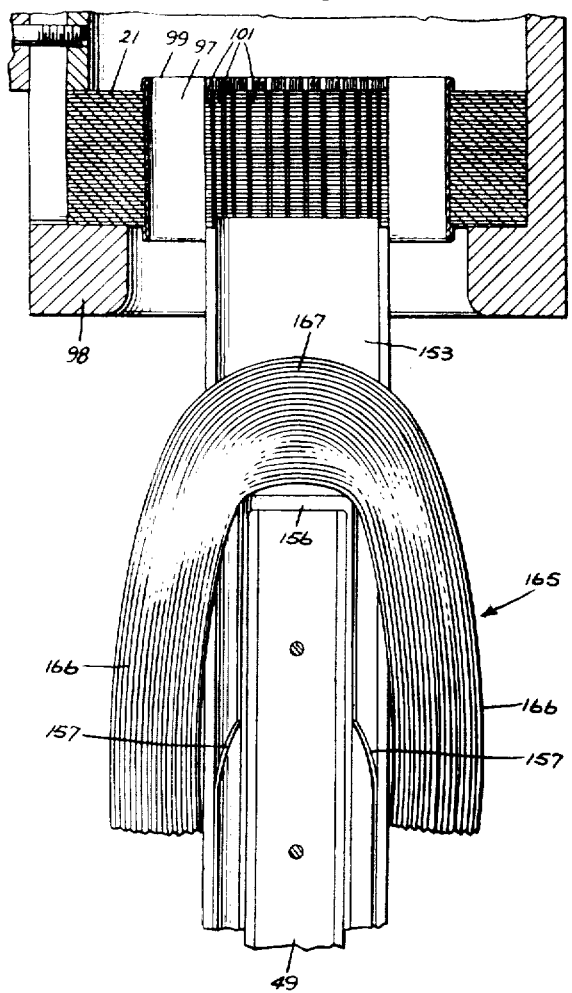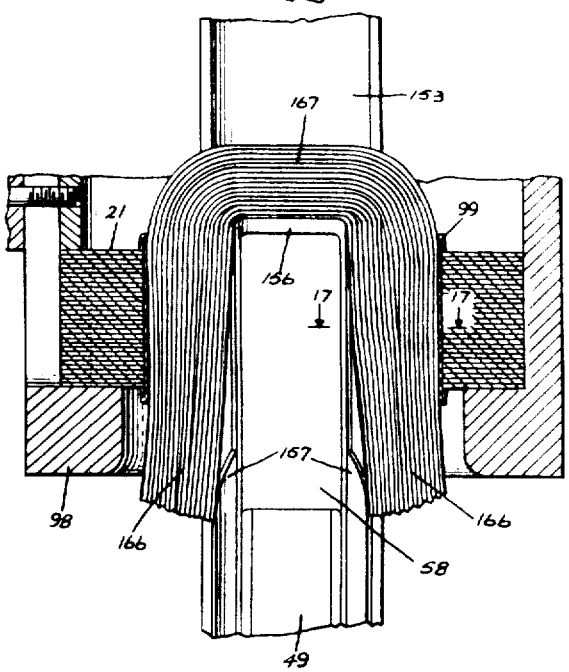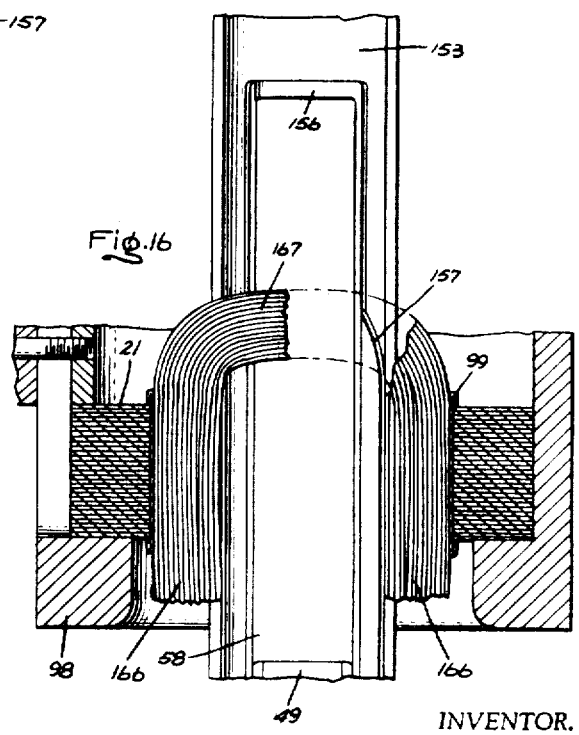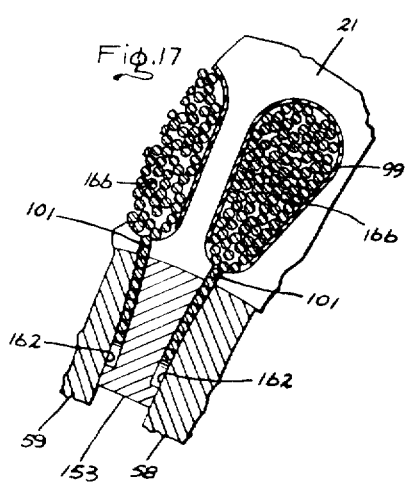
Fig. 14
Fig. 15
Fig. 16
Fig. 17
INVENTOR.
Richard B. Arnold,
BY Ralph E. Krisher Jr.
Attorney

METHOD FOR INSERTING INSULATORS AND COIL TURNS INTO THE SLOTS OF A MAGNETIC CORE

CROSS-REFERENCE TO RELATED APPLICATIONS

This is a divisional application of my copending application Ser. No. 875,895 filed Nov. 12, 1969 which in turn is a continuation-in-part of my application Ser. No. 748,405 filed July 29, 1968 now abandoned, which was copending therewith. A related application is my application Ser. No. 748,406 (assigned to the assignee of the present application) which was filed on July 29, 1968, and the disclosure of which is contained in my continuation-in-part application Ser. No. 884,145 now U.S. Pat. No. 3,579,791. Another related application is copending application Ser. No. 806,057 filed Mar. 11, 1969 now U.S. Pat. No. 3,579,818 in the name of Smith and Arnold.

BACKGROUND OF THE INVENTION

The present invention relates to an improved method for inserting side turn portions of an electrical coil in the slots of a magnetic core and for inserting both side turn portions and insulators in the slots of a magnetic core. More particularly, the invention relates to a method for inserting the coil side turn portions of the coil groups of an entire stator winding, and associated insulators when desired, into the axially extending slots of a core for use in a dynamoelectric machine in one stroke of the apparatus.

In the construction of dynamoelectric machines, such as an electric motor, the coil side turn portions of the stator windings are accommodated in axially extending slots of the stator core of the electric motor. It is a common practice in the motor manufacturing industry to place the coil turn side portions into the stator slots through the slot entrances in the bore with a tool of the type disclosed in the A. P. Adamson U.S. Pat. No. 2,432,267 and most often to concurrently insert insulators such as wedges or in-between winding insulation into the slot openings through the end face of the stator. In practices employing such prior art coil-inserting tools the prewound coils are placed in a preselected winding pattern over elongated fingers which are aligned with the stator teeth, and the coils are stripped from the fingers and forced into the slot entrances by a centrally disposed stripper. It will be apparent that the length of the fingers that position the winding for insertion in such a tool must necessarily project at least through and slightly beyond the end face of the stator core.

A disadvantage of such prior art coil-inserting tools and practices employing the same, particularly in applications where the tools are used to insert coils into stator cores having a relatively large stack height, is that difficulties have been encountered in rigidly supporting the elongated fingers. These fingers must be rigidly positioned with respect to the slot entrances to insure precise placement of the coils. With elongated fingers, the possibility of the conductor wire being nicked or damaged as it is stripped from the coil fingers is increased.

A further disadvantage is that the coils are stripped from between a pair of closely spaced stationary fingers by a centrally disposed stripper. With such arrangements both fingers exert a frictional restraining force on the coils which increases the possibility of the conductor wire being damaged.

Another disadvantage is that the adjustments required to be made in order for the tool to accommodate stator cores of varying stack heights are cumbersome and time consuming. It is, of course, particularly desirable from a standpoint of production efficiency that the required adjustments to the tool be relatively simple and require very little time of the operator. Further, in applications involving stator cores having a relatively small bore diameter, it is necessary to manually load the insulators into the tool for insertion into the core slots. Also, to increase production efficiency it is desirable that the coil-inserting tool or apparatus be adapted for mechanical loading of insulators over a wide range of stator core sizes.

Still another disadvantage of the prior methods is that essentially all the coil side turn portions are inserted in the slots in a generally axial manner. That is, essentially all the side turn portions are introduced into the predetermined slots at or near one end face of the core and then forced axially through the slots until the coils are fully positioned. In structures where the coil side turn portions substantially fill the slots, the side turn portions will be tightly bunched together as they are axially forced through the slots. This makes the insertion process more difficult and increases the possibility of conductor wire damage.

Accordingly, it is a general object of the present invention to provide an improved method for inserting side turn portions of a coil into a core having axially extending slots.

It is another general object of the present invention to provide an improved method for inserting insulators and side turn portions of a coil into preselected slots of a slotted structure such as, for instance, a stator of a dynamoelectric machine.

It is another object of the present invention to provide an improved method which includes effectively forming extensions of the winding receiving slots to receive at least some of the coil turn side portions while inserting other side turn portions into predetermined slots of a core.

A more specific object of the present invention is to provide an improved method by which the insertion of insulators and coil groups of a winding is facilitated while overcoming at least some of the above-mentioned objectionable features which are present in the prior art.

Another object of the present invention is to provide an improved method for inserting coil side turns in axially extending slots of a core which reduce the frictional forces exerted on the side turn portions.

Another object of the present invention is to provide an improved method of inserting turn side portions, and insulators when desired, into axially extending slots of a core, which method is selectively variable to accommodate cores of various stack heights It is a further object of the present invention to provide an improved method of precisely controlling the placement of the individual turns of coils and inserting the coils into the slots of a slotted structure.

SUMMARY OF THE INVENTION

In carrying out the objects in one form of my invention, I have provided an improved method and, for purposes of exemplification, apparatus that may be used in practicing such method and for inserting insulators, such as wedges and in-between insulation, and side turn portions of at least one electrical coil in selected slots of a slotted structure, as for example, the slots of the stator core of a dynamoelectric machine. The apparatus includes insulator guide means for holding and guiding insulators to be placed into the slots of the slotted core structure. Aligned with the axially extending slots of slotted core structure are a plurality of axially extending guide apertures in which are disposed a predetermined number of insulator pushers. Further included is a turn-inserting means comprised of a divider blade section and a predetermined number of coil turn feeder blades. The coil turn feeder blades are movable relative to the divider blade section and supported for axial movement with respect to the central opening of the slotted core structure. The insulator pushers, the divider blade section and coil turn feeder blades are actuated by a driver means, the insulator pushers being driven by the driver means over the entire length of its travel from an initial position to a fully extended position.

After a first increment of travel of the driver means from its initial position, the insulator pushers are brought into driving engagement with the insulators in the insulator guide means. During a second increment of travel, the divider blade section and coil turn feeder blades are conjointly moved a predetermined distance into the central opening of the slotted core structure. Finally, during the third increment of travel the coil turn feeder blades are extracted to complete placement of the conductor wire into preselected pairs of the slots of the slotted core structure. Thus, in the third increment of the continuous travel of the driver means only the coil turn feeder blades and insulator pushers are driven, and the insertion of the insulators and the placement of the conductor wire is completed during this increment of travel. Moving the coil turn feeder blades relative to the divider section during this third increment of continuous travel materially reduces the frictional force exerted on the conductor wire.

The positioning of the turn-inserting means within the central opening of the slotted structure results in an important advantage in that it permits a relatively rigid tooling structure to be used for precisely positioning the coil turn side portions for placement into the slots of the slotted structure through the entrances communicating with and precisely aligned with the central opening. It will be appreciated, of course, that the precise alignment results in a minimization of damage to the wire as the coil turn feeder blades are extracted to insert the turn portions into the selected slots of the slotted structure.

In accordance with other aspects of the invention and to facilitate the practice thereof, at least one of the coil turn feeder blades is formed with a reduced portion terminating in a pair of turn-pushing ledges for forcing the turns out of the blade section. A pair of turn-receiving gaps are formed by faces on the reduced portion of the coil turn feeder blade and corresponding faces of an adjacent pair of divider blades. These gaps effectively form extensions of the slots of the slotted structure, which extensions receive at least part of the coil turn sides in alignment with the slots. Then during the third increment of travel the turn-pushing ledges move these coil turn sides into the corresponding slots in a generally radial manner. Preferably, during the third increment of travel the driver means is cushioned by fluid pressure as the insulator pushers and coil turn feeder blades are advanced to the fully extended position.

In another more specific form, the turn-inserting means is supported in nonrotatable relation with respect to the insulator guide means and both the turn-inserting means and the insulator guide means are rotatably mounted relative to a support member to allow the assembly to be rotated for receiving coil turns in the turn-receiving gaps. Also, preferably, the blade section may be formed with a preselected number of guide members, and the coil turn feeder blades are formed with integral bifurcated end portions that slidably straddle the guide members for controlling the movement of coil turn feeder blades as they are extracted out of the divider blade section.

One aspect of the improved method includes the steps of placing insulators into guide apertures in an axial direction opposite to the direction in which the insulators are to be ejected into the slots and positioning coil turns in curved turn-receiving gaps of a coil-inserting tool. Each of the curved turn-receiving gaps have axially extending slits aligned with the slot entrances of selected pairs of slots. Additionally, the method includes the steps of effecting a first movement of the coil-inserting tool into the central opening of the stator core whereby the axially extending slits are aligned with the slot entrances and then pushing the turns into selected pairs of the axially extended slots of the stator core while conjointly pushing the insulators into the slots, the insulators being pushed in a direction opposite to the axial direction in which they were initially placed into the guide apertures.

One important advantage of the improved method is that it is possible to utilize mechanical insulator loaders in applications where the windings and insulators are to be inserted in cores having a relatively small bore size.

The subject matter which I regard as my invention is particularly pointed out and distinctly claimed in the concluding portion of the specification. The invention itself, however, taken with further objects and advantages thereof, may be best understood by reference to the following description taken in conjunction with the accompanying drawings which for purposes of exemplification illustrate apparatus that may be used in the practice of the invention and in which:

BRIEF DESCRIPTION OF THE DRAWINGS

FIG. 1 is a front elevational view of a preferred form of an improved insulator and coil-inserting apparatus for use in the practice of the invention and in connection with a stator core of a two pole motor;

FIG. 2 is a top view of the insulator and coil-inserting apparatus shown in FIG. 1;

FIG. 3 is a top view of an insulator and coil-inserting apparatus for use in the practice of the invention and in connection with stator cores of four pole motors exemplifying another embodiment of the invention;

FIG. 5 is a sectional view of the insulator and turn-inserting apparatus shown in FIGS. 1 and 2 taken essentially along lines 5—5 of FIG. 2 and illustrating the position of the various parts of the apparatus in the initial position;

FIG. 6 is a sectional view corresponding to the view shown in FIG. 5 illustrating the position of various parts of the insulator and turn-inserting apparatus when the driver plate has been driven to the position where it butts against the insulator positioning stop nut;

FIG. 7 is a sectional view corresponding to the view shown in FIG. 5 illustrating the position of the parts of the insulator and turn-inserting apparatus when the driver plate has reached the point where the stack height adjusting nut butts against a stationary plate, and the blade section and coil turn feeder blades extend through the bore of the stator having traversed through increments of travel A and B;

FIG. 8 is a sectional view corresponding to the view shown in FIG. 5 illustrating the insulator pushers and coil turn feeder blades in their fully extended position, the insulator pushers having traversed through the increments of travel A, B and C;

FIG. 9 is an enlarged fragmentary sectional view taken along line 9—9 of FIG. 2 and a fragmentary sectional view of a stator core and core-support assembly with the coil turns and insulators shown in their respective positions after the insulator pushers have been driven through the first increment of travel A;

FIG. 10 is an enlarged fragmentary sectional view corresponding to the view shown in FIG. 9 showing the operation of the insulators and coil turns after the driver has passed through increments of travel A and B;

FIG. 11 is an enlarged fragmentary sectional view corresponding to the view shown in FIG. 9 showing the position of the insulators and coil turns after the driver has passed through increments of travel A, B and C;

FIG. 12 is a perspective view of a coil turn feeder blade illustrating a modification wherein slidably disposed members are provided to push turns away from the slot entrances into the slots of the stator core and to effect a press-back of the coil turns;

FIG. 13 is an exploded perspective view of the upper portion of another embodiment of the coil-inserting apparatus with the coil turn feeder blades pulled out of the divider blade section;

FIG. 14 is a fragmentary cross-sectional view of the coil-inserting apparatus of FIG. 13 with a stator core and core-support assembly and coil turns shown in their respective positions before coil turn insertion, and with certain components such as insulators and insulator pushers omitted for the sake of simplicity;

FIG. 15 is a fragmentary cross-sectional view similar to FIG. 14 but with the feeder blades partially through their coil-inserting movement;

FIG. 16 is a fragmentary cross-sectional view similar to FIG. 14 but with the feeder blades completely through their coil-inserting movement; and FIG. 17 is an enlarged, fragmentary cross-sectional view as seen along line 17—17 in FIG. 15.

DESCRIPTION OF THE PREFERRED EMBODIMENTS

Figure 4:
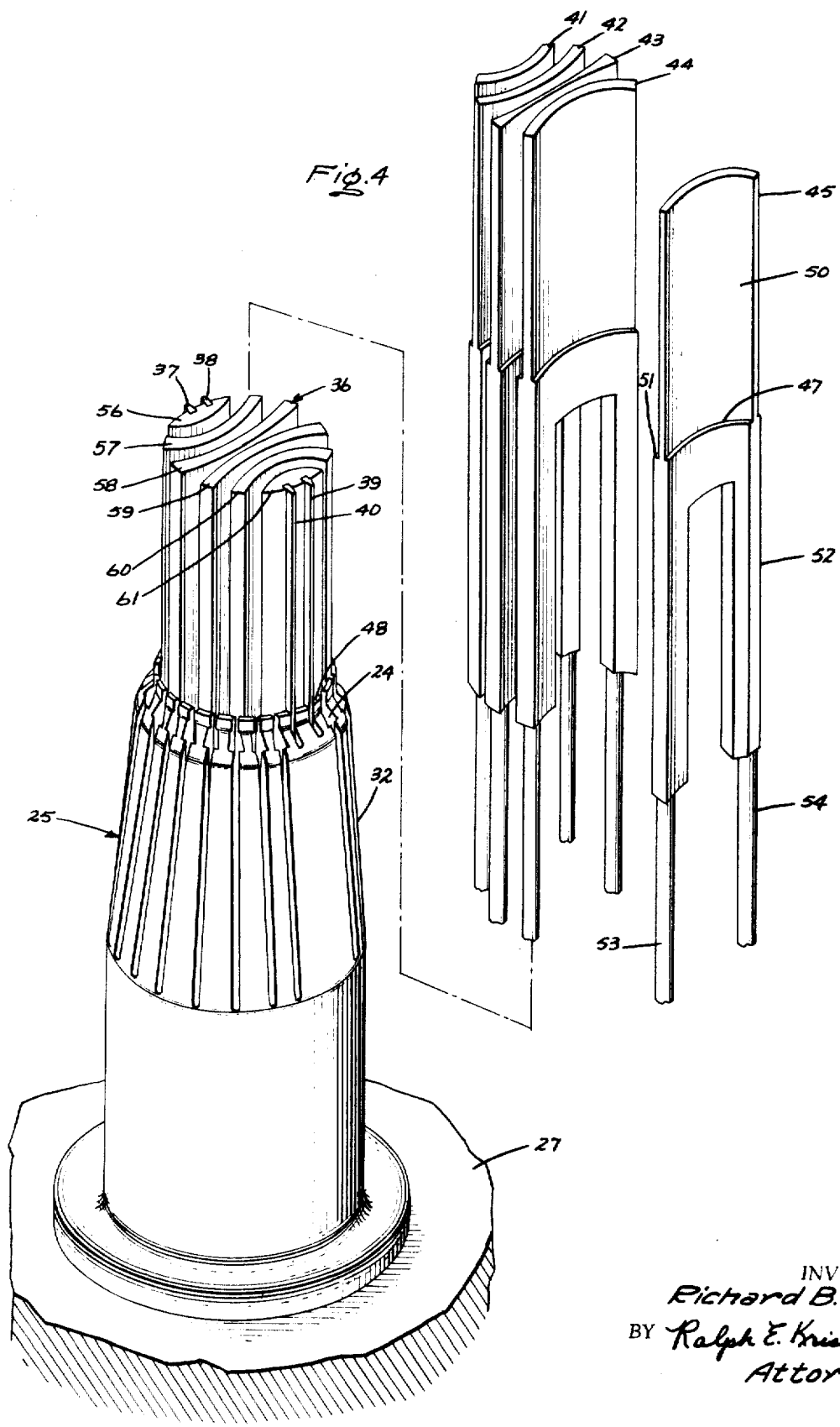
FIG. 4 is a perspective view of the upper portion of the insulator and coil-inserting apparatus shown in FIGS. 1 and 2 with the coil turn feeder blades pulled out of the divider blade section.

Having more specific reference now to the drawings and particularly to FIGS. 1, 2, and 4 through 11, I have illustrated therein an insulator and turn-inserting apparatus 20 adapted for use in the practice of the invention in connection with a stator core 21 of a two pole electric motor. In FIG. 1 the stator core 21 is shown in dashed outline in position over the insulator and turn-inserting apparatus 20 for receiving the coil groups which comprise a secondary winding. It will be noted that in order that the structural features of the insulator and turn-inserting apparatus 20 can be clearly shown, the coil turns are not shown in FIGS. 1, 2, and 3 through 8.

A primary purpose of the insulator and turn-inserting apparatus 20 is to insert into the axially extending slots of the stator 21, all of the interconnected polar coil groups simultaneously and, when desired, to place the insulators, which in the illustrative embodiment included both wedges and in-between insulation, in proper sequence without damage to either the wire insulation or the insulators during the insertion process. The insulator and turn-inserting apparatus 20 of the preferred embodiment is designed to insert windings in a stator with stack height ranging from three quarters of an inch to six inches and for inserting insulators having length ranging from one inch to seven inches. With very minor adjustments to the stop nuts 22, 23, the insulator and turn-inserting apparatus 21 can be used to insert the winding and insulators in the stator formed of the same laminations within this range of stack heights. Although in the illustrated exemplification of my invention I have shown my insulator and turn-inserting apparatus adapted for a stator of a two pole motor, it will be appreciated that the inserting apparatus can be readily adapted for inserting the coils and insulators in other multi-pole magnetic structures such as the stators of four and six pole motors.

Before I proceed with the more detailed description of the illustrated insulator and turn-inserting apparatus 20, it should be understood that the insulators are initially loaded into the apparatus 20 by inserting them into insulator guide apertures 24 before the stator 21 is positioned over the head assembly 25 and before the coils are placed in the head assembly 25. Preferably, the insulators are directly loaded from an insulator making and inserting apparatus of any suitable construction (not shown). Further, it will be understood that after the insulators are loaded in the guide apertures 24, a predetermined number of coils are initially developed with a preselected number of turns per coil from insulated wire disposed in the appropriate turn-receiving gaps 26 of the head assembly 25. This coil developing operation may be accomplished in any suitable manner such as, for example, in the way disclosed in my previously referred to copending patent application Ser. No. 748,406, which was filed on July 29, 1968 and is assigned to the assignee of the present patent application.

In order that the improved insulation and turn-inserting apparatus 20 may be adapted for use in conjunction with apparatus of the type disclosed in my copending patent application, the insulator and turn-inserting apparatus 20 is rotatably supported on a table 27 by ball bearings 28 and 29. As is best seen in FIG. 2, a driving gear 30 meshes with a driven gear 31 attached to insulator guide housing 32 of the apparatus 10. The drive gear is driven to effect a 180 degrees rotation of the apparatus 20 between latches 33 and 34 from a coil winder or coil transfer device.

The insulator and turn-inserting apparatus 20 is generally comprised of the head assembly 25 and an actuating assembly 35. The head assembly includes the insulator guide housing 32, the driven gear 31, a divider blade section 36, vertical guides 37, 38, 39, 40 (See FIG. 4) and coil turn feeder blades 41, 42, 43, 44 and 45. As is best seen in FIG. 2, the divider blade section 36 and the coil turn feeder blades 41, 42, 43, 44 and 45 define the ten turn-receiving gaps 26 in which the turns of the coils to be inserted are placed. The peripheral edges of the gaps 26 form slits 46, which slits are aligned with the axially extending slot entrances of the stator when it is in position on the head assembly 25. It will be understood that the insulator guide apertures 24 are axially aligned with the stator slots so that the insulators can be pushed therein as the side turn portions of the coil are forced through the slot entrances. As will be hereinafter more fully explained in connection with the detailed description of the operation of apparatus 20, the leading edges of the insulators preferably trail behind the turn-pushing ledges 47, 51 of the coil turn feeder blades by a predetermined distance. It was found that if the leading edge of the insulators trail too far behind the turn-pushing ledges 47 as the insulators are being inserted, the turns passing through the slot entrances of the stator 21 may spiral, twist and jam. The leading edge of the insulators should not, of course, lead the turn-pushing ledges 47 since the insulators would then force the turns into the slot entrances with damage to the insulated wire and insulators possibly resulting.

In FIG. 4 I have shown the coil turn feeder blades 41, 42, 43, 44 and 45 pulled out of the divider blade section 36 which is shown fully extended out of the insulator guide housing 32. The vertical guides 37, 38, 39 and 40 are engaged in slots 48 formed in the insulator guide housing 32 and also are engageable with slot entrances of the stator aligned therewith when the stator is in position on the insulator guide housing 32. With this arrangement the divider blade section 36 is disposed in nonrotatable relation with respect to the stator 21 and with respect to the insulator guide housing 32 although it is free to be moved in an axial direction.

The coil turn feeder blade 45, as well as the other coil turn feeder blades 41, 42, 43, 44, is formed with a reduced thickness portion 50 which defines a pair of turn-pushing ledges 47 and 51. It will be appreciated that when the coil turn feeder blade 45 is positioned in the divider blade section 36, the walls of the reduced portion 50 and the corresponding walls of the divider blade section 36 define a pair of the turn-receiving gaps 26 (See FIG. 2). The turn feeder blade 45, along with the other coil turn feeder blades 41, 42, 43, 44, have a bifurcated portion 52 which straddles a guide member 49 (See FIG. 5). A pair of studs 53, 54 are attached to each of the bifurcated portions 52, and a total of five pairs of these studs attached the coil turn feeder blades 41, 42, 43, 44 and 45 to a cylinder end cap assembly 55 for movement therewith.

The divider blade section 36 includes the six curved divider blades 56, 57, 58, 59, 60 and 61, five guide members 49 and an adapter 63. The guide members 49 are held in assembled relation between the divider blades 56, 57, 58, 59, 60 and 61 by the screws 62 and provide accurately maintained spaces in which the coil turn feeder blades 41, 42, 43, 44 and 45 are slidably disposed. The divider blade section 36 is attached to an adapter 63 driven by a shaft 64. It will be noted that the adapter 63 is provided with a series of pairs of openings 65, 66 which allow the studs 53, 54 free axial movement relative to the adapter 63. This provides a relatively rigid head assembly 25 for guiding the coil turns in the stator slots and minimizes the possibility of damage to conductor wire insulation as the coil turns are inserted through the slot entrances.

Having more specific reference now to FIGS. 1, 2, 4, 5, 6 and 7, I will now describe the actuating assembly 35. The principal components of this assembly are the insulator pushers 67, a driver plate or driver 68, a stationary plate 69, driver guide rods 82, 83, the blade divider section shaft 64, a piston 72 mounted on the shaft 64, a feeder blade cylinder 73, a feeder blade adapter 84, insulator-positioning stop nut 22, the stack height adjusting stop nut 23, and a stop ring 76. A clamp 77 holds the insulator pushers 67 in assembled relation with the adapter 84 which is attached to driver 68.

As is best seen in FIG. 6, the driver 68 has a pair of flanged portions 78, 79 that are engageable with the pushrods 80, 81 of double-acting hydraulic cylinders (not shown). Any axial movement of the stationary plate 69 is constrained by the driver guide rods 82 and 83 which are attached to the driven gear 31. With this arrangement the stationary plate 69 will rotate with the insulator and turn-inserting apparatus 20 but is not free to move axially with respect to the support member or table 27 and serves as a stop for the stack height adjusting stop nut 23.

It will be noted that the outer peripheral surface of the feeder blade cylinder 73 is threaded, and the threads of the insulator-positioning stop nut 22 are engaged thereon. When the driver 68 engages the insulator-positioning stop nut 22 as is shown in FIG. 6, the feeder blade cylinder 73 will be carried by the driver 68, and the continued movement of the driver 68 in an upward axial direction will cause the coil turn feeder blades 41, 42, 43, 44 and 45 to be moved axially upward. A stop ring 76 is attached to the feeder blade cylinder 73 at its lower end by a snap ring 74 and serves as a base support for the cylinder 73. In the initial position, both the driver 68 and the stop ring 76 are supported by the stationary plate 69.

In FIG. 6 it will be seen that the blade divider section shaft 64 has a central bore 85 that extends just below the point where the piston 72 is attached on the shaft 64. At the lower end the central bore 85 is connected by a drilled passageway 86 to a slip ring 87 and to an air hose 88 connected to a source of air pressure. Pressurized air enters at the bottom of the shaft 64 and passes through the central bore 85 to a radial passageway 89 adjacent to the top of the cylinder 73. With air pressure in the cylinder 73, the divider blade section shaft 64 will move with the feeder blade cylinder 73 until the stack height adjusting nut 23 (i.e., stop nut 23) contacts the stationary plate 69 (See FIG. 8). Any further axial movement of the divider blade section shaft 64 in an upward direction is restrained by the stationary plate 69, and the feeder blade cylinder 73 will now move relative to the piston 72 causing a compression of the air within the cylinder 73 thereby cushioning the coil feeder blades 41, 42, 43, 44 and 45 as they are extracted from the head assembly 25 to complete the placement of the winding in the slots of the stator 21.

A knob 90 on the shaft 64 holds the slip ring 87 in assembled relation on the shaft 64. As will be seen in FIG. 5, a clearance is provided between a lock nut 92 and the bottom plate 91. In the illustrated embodiment of the actuating assembly 35 of my invention, the table 27 is rotatable to allow the insulator and turn-inserting apparatus 20 to be rotated from one work station to another.

In FIGS. 5, 6, 7 and 8, the relative positions of the components of the head assembly 25 and the actuating assembly 35 are shown as the piston rods 80, 81 push the driver 68 through one complete stroke or from an initial position shown in FIG. 5 to a fully extended position shown in FIG. 8. In the interest of simplification, the relative positions of the coil turns in the head assembly 25 are omitted in FIGS. 5, 6, 7 and 8, the relative positions of the coil turns being illustrated in FIGS. 9, 10 and 11. It will be noted, however, that the position of the insulators 75 are illustrated as the insulator pushers 67 are advanced from the initial position through the increments of travel A, B and C.

The initial position of the insulator and turn-inserting apparatus 20 is shown in FIG. 5, and also the three increments of travel are shown measured off from the leading edge of the insulator pushers 67. It will be appreciated that as the driver 68 is actuated by the piston rods 80 and 81, the insulator pushers 67 will be carried by the driver 68 during the entire length of its travel. The stack height adjusting stop nut 23 and the insulator-positioning stop nut 22 have been set to a predetermined position to allow the insulator and coil turn-inserting apparatus 20 to accommodate a stator 21 of a particular stack height. This selective setting of nuts 22 and 23 to the predetermined or desired positions thereof selectively sets the increment of separate movement or travel of the insulator pushers relative to the divider blade section. At the end of this increment of travel, the insulator pushers will be in a preselected position with respect to the blades of the divider blade section. The position of the stack height adjusting stop nut 23 on the divider blade section shaft 64 determines the distance which the divider blade section will conjointly move through the increment of travel B.

Although in the stator 21 used in the illustrated exemplification of the invention, it is necessary to set the stack height adjusting stop nut 23 so that it is a preselected distance below the stationary plate 69, it will be understood in the illustrated embodiment of the invention a stator with a stack height of approximately three quarters of an inch can be accommodated by setting the stack height adjusting stop nut 23 so that it is right against the stationary plate 69. The insulator and coil-inserting apparatus 20 of the illustrated embodiment is designed with the divider blade section 36 and the coil turn feeder blades 41, 42, 43, 44 and 45 extending outwardly above the insulator guide housing 32 sufficiently to accommodate a stator with a stack height of three quarters of an inch. Thus, where a stator 21 with a stack height of three quarters of an inch is being accommodated, the increment of travel B would be equal to zero. Also, the insulator-positioning stop nut 22 would, of course, have to be set to a position close to the top of the feeder blade cylinder 73 as required in order to properly position the leading ends of the insulator pushers 67 with respect to the turn-pushing ledges 51 of the coil turn feeder blades.

From the foregoing discussion, it will be apparent that the selectively set first increment of travel represents the distance traveled by the insulator pushers 67 or the driver 68 from the initial position when the driver 68 rests against the stop ring 76, as shown in FIG. 5, to the position in which the driver 68 engages the insulator-positioning stop nut 22 as shown in FIG. 6. During the first increment of travel A, only the insulator pushers 67 are being moved in an axial direction. At the end of this first increment of travel, the insulators 75 are now at a preselected positioned a preselected distance with respect to the turn-pushing ledges 47, 51 of the coil turn feeder blades. This position, being preselected by setting stop nut 22, is related to the particular stack height of a core as earlier mentioned.

It will be appreciated that in the illustrated embodiment of my invention, the insulators 67 were inserted by an insulator-making machine in an axial direction that is opposite to the direction in which they are to be inserted into the slots of the stator 21. The insulators 67 are loaded into the apertures 24 of the insulator guide housing 32 before the coil turns are placed in the turn-receiving gaps 21 and are pushed a sufficient distance into the apertures 24 so that they will be well clear of the coil turns.

Referring now more specifically to FIG. 6, it will be seen that when the driver 68 is engaged with the insulator-positioning stop nut 22, the feeder blade cylinder 73 and the divider blade section shaft 64 will now travel conjointly with the driver 68 and the insulator pushers 67. The distance through which this conjoint travel will take place depends upon the position of the stack height adjusting stop nut 23 with respect to the stationary plate 69. During the increment of travel B the stack height adjusting stop nut 23 will travel with the divider blade section shaft 64 in an axial direction toward the stationary plate 69, and both the divider blade section 36 and the coil turn feeder blades 41, 42, 43, 44 and 45 are driven as a relatively rigid assembly into the bore of the stator 21.

Upon completion of its travel through the increment B, the divider blade section 36 has passed through the core of the stator 21, and the stack height adjusting stop nut 23 butts against the stationary plate 69. With the stack height adjusting stop nut 23 stopped against the stationary plate 69, any further movement of the divider blade section shaft 64 in an axial direction is restrained. As is best seen in FIG. 7, the driver 68 will now begin its third selected increment of travel C. The divider blade section 36 will remain in the position shown in FIG. 7 during the travel of the driver 68 through the increment C of relative travel of the core, blades and insulator pushes. The insulator pushers 67 will now cause the insulators 75 to emerge from the guide apertures of the insulator guide housing 32 into the vertically extending slots of the stator 21. Upon completion of its travel through increment C, the coil turn feeder blade 43 and the other coil turn feeder blades are in a fully extended position, and the insulators 75 and coil turn side portions have been positioned in the slots of the stator 21.

It will be seen that during the increment of travel C the axial movement of the feeder blade cylinder 73 is guided by a key 95 attached to the divider blade shaft 64 and engaged in a keyway 93 formed in the cylinder end cap 55. In the illustrated embodiment of the invention, the completion of the increment of travel C was determined by the stroke of the cylinders operating the piston rods 80 and 81. It will be appreciated, of course, that although for the purpose of describing the operation of the insulator and coil-inserting apparatus 20, I have referred to three specific increments of travel, one continuous movement or stroke is involved. On the return stroke of the piston rods 80 and 81, the actuating assembly 35 is restored to the initial position shown in FIG. 5.

Turning now to FIGS. 9, 10, 11, I will now more specifically describe the operation of the head assembly 25 in effecting the insertion of the coil turns 96 into the slots 97 of the stator 21. The stator 21 used in the exemplification of the invention was provided with slot liners 99. It is necessary, of course, that the stator 21 be firmly supported in position over the head assembly 25, as is illustrated in FIGS. 9, 10, 11. The stator 21 is clamped in a fixture 98, only a portion of which is shown therein. For a more complete description of a suitable fixture that may be used in conjunction with my improved insulator and coil-inserting apparatus 20, reference may be had to copending application Ser. No. 806,057 filed Mar. 11, 1969 (now U.S. Pat. No. 3,579,818) of which I am coinventor and which is assigned to the same assignee as the present application.

In FIG. 9 the head assembly 25 is shown with the insulators 75 positioned for insertion in the slots 97, the driver 68 having completed its travel through increment A and the components of the apparatus 20 being in the relative positions as shown in FIG. 6. It will be noted that the leading edges 94 of the insulators 75 lag slightly behind the turn-pushing ledges 47, 51 and that the turns of the winding 100 which extend over the sides of the insulator guide housing 32 clear the leading edges of the insulator 75.

Upon completion of its travel through the second increment of travel B, the head assembly 25 has now extended into the bore of the stator 21 as shown in FIG. 10, the coil turns 96 have partially entered the slots 97. This view corresponds to the view of the apparatus 20 shown in FIG. 7 wherein the stack height adjusting stop nut 23 has engaged the stationary plate 69, and the driver 68 has traversed through increments of travel A and B. It will be apparent from FIGS. 7 and 10 that the head assembly 25 forms a relatively rigid structure within the stator bore that facilitates the alignment of the turn-receiving gaps 26 with the slot entrances.

As the driver 68 continues through increment of travel C, the coil turns 96 are inserted in the slots 97, and concurrently the insulators 75 are pushed into the slots 97 to close off the slot entrances of the stator 21. On completion of the travel through increment C to the fully extended position shown in FIG. 11, it will be seen that the coil turn feeder blades 41, 42, 43, 44 and 45 force the coil turns 96 completely through the slots 97. Also, the insulators 75 are pushed into the slots 97 to completely close off the slot entrances and prevent turns from getting into the stator bore. Thus, possible damage to the turns is minimized when the coil turn feeder blades 43, 44 and 45 are retracted, and the divider blade section 36 is lowered to its initial position.

It also will be seen from FIGS. 10 and 11 that, during increment of travel C, the coil turn feeder blades 41-45 move axially with the coils and relative to the divider blade section 36. This means that only the divider blades 56, 57, 58, 59, 60 and 61 are exerting a frictional force on the coil turns 96, rather than both the divider blades and the feeder blades.

It will be apparent from examination of the coil turns 96 as shown in FIG. 11 that when the head assembly 25 is retracted to the initial position the coil turn feeder blades 43, 44 and 45 will readily slide out of engagement with the winding 100 since the coil turns 96 are essentially locked in the slots 97 by the insulators 75. During the down stroke of the driver 68, the coil feeder blades 43, 44 and 45 are lowered along with the divider blade section 36 to the initial position as shown in FIG. 9. The insertion of the insulators 75 and the winding 100 is now complete, and the stator 21 is removed from the head assembly 25.

It will be readily apparent that, in the event it is not desired to utilize insulators, the apparatus thus far described may be used to expeditiously insert coil turns alone by merely omitting the insulators. The coil turns will be firmly supported and precisely placed both before and during insertion into the slots.

Viewing FIGS. 9–11 it will be seen that essentially all of the turns of each coil are introduced into their corresponding slots at or near one axial end of the stator. Then the coil turn side portions are moved through the axial length of the slots to their fully inserted position. This is a fully satisfactory method and apparatus for inserting coils into most stators. However, for some stators, in which the inserted coil turns will cause the slots to be substantially full, this axial movement of all the coil turn side portions through the slots could cause damage to the insulated wires forming the coils.

Having reference now to FIGS. 13–17 I will now more fully describe the modification illustrated therein. FIG. 13 illustrates a modified head assembly 150 in which the divider blade section 36 may be the same as in the above-described apparatus, having divider blades 56, 57, 58, 59, 60 and 61. However, the coil turn feeder blades 151, 152, 153, 154 and 155 are somewhat modified from the previously described feeder blades 41–45. The turn-pushing ledges 156 on each side of the feeder blades 151–155 terminate inwardly of the peripheral edges of the feeder blades. The feeder blades 151–155 are also provided with a plurality of curved shoulders 157 axially recessed from the ledges 156 and extending to the peripheral edges of the feeder blades 151–155. In the illustrated embodiment a shoulder 157 is provided on each side of each turn-pushing ledges 156. Each of the feeder blades 151–155 has a bifurcated portion 158 which straddles guide member 49. A pair of studs 159, 160 are attached to each of the bifurcated portions 158, and these studs attach the turn feeder blades 151–155 to the cylinder end cap assembly 55 for movement therewith.

When coil turn feeder blades 151–155 are mounted intermediate the divider blades 56–61 in the divider blade section 36 the reduced thickness portions 161 of the feeder blades 151–155 will form gaps 162 between each feeder blade and each of the next adjacent divider blades. These gaps 162 extend axially beyond the turn-pushing ledges 156 to the shoulders 157.

Viewing FIGS. 14–16 in particular I will now more particularly describe the method of coil insertion in accordance with this embodiment of the invention. It will be recognized that, for the sake of clarity and simplicity, some parts such as the insulator guide housing and insulator pushers have been omitted from these figures. In FIG. 14 a core 21 having axially extending slots 97 (with slot liners 99) and axially extending slot entrances 101 have been positioned in alignment with head assembly 150. Coils 165 have been placed in the gaps 162 and rest on the turn-pushing ledges 156.

Thereafter the divider blade section 36 and the coil turn feeder blades 151–155 are concurrently moved axially through the bore of the core 21 until the end of the divider blades 56–61 and the feeder blades 151–155 project just beyond the other end face of the core 21. This brings the gaps 162 substantially into alignment with the slots 97 and slot entrances 101 so that the gaps effectively form extensions of the slot entrances.

Then the divider blades 56–61 stop and the feeder blades 151–155 are moved axially relative to the divider blades so that the turn-pushing ledges 156 travel axially through the bore. This causes part of the side turn portions 166 of the coils 165 to enter the slots 97 at or near the lower end face of the core (as seen in FIGS. 14–16) and to move axially through the slots. Other of the side turn portions are received in the slot extensions formed by the gaps 162, particularly the portions of the gaps 162 axially between the ledges 156 and the shoulders 157. As the end turn portions 167 of the coils 165 emerge from the core 21 they are free to move off of the ledges, as they no longer are restrained between the divider blades 56–61 and the feeder blades 151–155. This condition is illustrated in FIGS. 15 and 17.

Then, as the feeder blades 151–155 travel an additional distance relative to the divider blades, the shoulders 157 force the other side turn portions into the slot entrance from the slot extensions formed by gaps 162. These other side turn portions are inserted in a generally radial direction and, as they are forced into the slot entrances, they tend to move all the way into the slots 97. This condition is illustrated in FIG. 16. The feeder blades and divider blades now may be axially removed from the core without disturbing the coil groups.

Even if the side turn portions 166 are so bulky as to substantially completely fill the slots 97, the insertion will not tend to cause damage to the conductor wire as some of the other side turn portions are received and at least temporarily stored in the slot entrance extensions formed by the gaps 162 until the axial movement of the coils is substantially finished (as best illustrated in FIG. 17). Then the remainder of the side turn portions are inserted in a generally radial manner. It will be apparent from FIG. 17 that the previously inserted side turns are thus forced into a compact mass within the slots.

It will be understood that with the embodiment of FIG. 13, the actuating assembly 35 should be adjusted in the manner generally described above to provide for more relative movement of the feeder blades and divider blades than with the embodiment illustrated in FIG. 4. Also it will be understood that insulators may be inserted with this embodiment also, merely by making appropriate adjustments so that the leading edge of the insulators just slightly trail the shoulders 157.

Having reference now to FIGS. 3 and 12 I will now more fully describe certain other modifications illustrated therein. In FIG. 3 I have shown insulator and turn-inserting apparatus 104 with a head assembly 105 adapted for inserting insulators and groups of coil turns in a stator of a four pole motor. The head assembly 105 is supported on a table 106 by means of a removable support plate 107 which is bolted to the table by bolts 108. With this mounting arrangement it is possible to remove the entire apparatus 104 from the top of the table 106.

It will be seen that the turn-receiving gaps 109 are aligned with pairs of stator slots 110 for placement of the coil turn side portions therein. The head assembly 105 includes eight coil turn feeder blades 111, 112, 113, 114, 115, 116, 117, 118, a central divider blade 119, and eight curved divider blades 120, 121, 122, 123, 124, 125, 126 and 127. Although not shown in FIG. 3, a plurality of insulator pushers are axially aligned with the slots 110 for effecting a placement of insulators, such as wedges, in-between insulation or other insulation, into the slots 110.

The insulator and coil turn-inserting apparatus 104 is similar in operation to apparatus 20 adapted for stators of two pole motors and, as in the case of apparatus 20, each coil group handled by the apparatus may comprise one or more coils. The driver is moved continuously through a first, second and third increment of travel to effect the placement of the insulators and coil turns in the slots 110. During the second increment of travel the coil turn feeder blades 111, 112, 113, 114, 115, 116, 117 and 118, the central divider blade 119, and the curved divider blades 120, 121, 122, 123, 124, 125, 126 and 127 are concurrently extracted into a stator. During the third increment of travel of the driver the coil turn feeder blades 111, 112, 113, 114, 115, 116, 117 and 118 are extracted to the fully extended position to complete the placement of the coil turn side portions in predetermined pairs of slots 110.

In FIG. 12 I have illustrated a modification wherein a press-back fin member 129 and a slot entrance fin member 130 are used in conjunction with a coil turn feeder blade 131 to perform additional functions as may be required in particular applications. The coil turn feeder blade 131 includes a reduced portion 132 and a bifurcated portion 133. It will be noted that the turn-pushing ledge 134 terminates at a predetermined distance from the sides of the coil feeder blade 131 to provide a guide shoulder 135 for guiding the press-back fin member 129 and slot entrance fin member 130. It will be appreciated that the press-back fin member 129 and slot entrance fin member 130 provide feeder blade shoulders and move in an axial direction relative to the coil turn feeder blade 131 and are driven by the pushrods 136, 137 respectively. The coil turn feeder blade 131 is driven by movement of studs 138 and 139 which are actuated by the driver.

During operation the press-back fin member 129 and the slot entrance fin member 130 will trail the coil turn feeder blade 131. As the press-back fin member 129 is forced into the slots, the laterally extending portion 140 passes inside the slot forcing the coil turns farther into the slot. Preferably, the cross-sectional shape of the laterally extending portion 140 should generally conform with the cross-sectional configuration of the slots. It will be apparent that in the pairs of slots where coil turns are being pressed back insulators cannot be inserted in the slots as the press-back is being effected. The fins 141 of the slot entrance fin member 130 extend only into the slot entrances and force any displaced coil turns in the slot entrances farther back into the slots. Insulators may, of course, be placed concurrently in the pairs of slots through which the fins 141 pass since the fins 141 do not present any obstruction to the placement of the insulators in the slots.

Although in the illustrated embodiment of my invention, I have shown the coil-receiving gaps as being substantially constant, it will be appreciated that in some applications it may be desirable to vary the dimension of this gap. In FIG. 12 the coil feeder blade 132 and the two adjacent divider blades 142, 143 define coil-receiving gaps 144, 145 with a transverse dimension that is not the same along the width of the blades but progressively increases towards the middle of the blade assembly. Preferably, a coil-receiving gap with a variable dimension is used where the conductor wire has a relatively large diameter size as compared with the transverse dimension of the coil-receiving gap in which the conductor wire is to be inserted. With such an arrangement, the possibility of crossed-over conductor wire jamming in the coil-receiving gaps is minimized.

From the foregoing description of the improved insulator and turn-inserting apparatus and method exemplifying the invention, it will be apparent that the placement of insulators and coil turns into a slotted structure can be efficiently accomplished. The apparatus can be quickly and readily adjusted to accommodate slotted structures over a wide range of stack heights and is adaptable for use in connection with insulator loading machines. With the improved head assembly arrangement a rigid structure is provided for precisely controlling the insertion of the coil side turn portions, and possible damage to the conductor wire of the coil side turn portions during the insertion process is minimized.

While I have shown and described various embodiments of the invention, it will be obvious to those skilled in the art that changes and modifications may be made without departing from the invention. It is therefore intended in the appended claims to cover all such changes and modifications that fall within the true spirit and scope of my invention.

What I claim as new and desire to secure by Letters Patent of the United States is:

1. A method of inserting side portions of a group of turns of electrical conductor wire into predetermined axially extending slots of a core having axially extending slot entrances in communication with a periphery of the core, the method comprising the steps of: placing the turns in turn-receiving gaps formed in alignment with predetermined ones of the slot entrances; substantially axially inserting some turn side portions into the predetermined axially extending slots while receiving other turn side portions in slot entrance extensions associated with the gaps; then inserting the other turn side portions from the extensions into the predetermined ones of the slot entrances.

2. The method as set forth in claim 1 including the step of compacting the side turn portions within the predetermined slots.

3. A method of inserting side turn portions of a group of electrical coils formed of conductor wire into predetermined axially extending slots of a core having axially extending slot entrances in communication with a periphery of the core; the method comprising the steps of: placing coil turns in turn-receiving gaps formed between relatively movable blades of an inserting apparatus; substantially axially inserting some of the side turn portions into the predetermined slots and positioning other of the side turn portions in slot entrance extensions formed by the gaps by moving the blades axially adjacent the periphery with the gaps substantially in alignment with the predetermined slot entrances; pushing the other side turn portions at least into the predetermined slot entrances by axially moving alternate ones of the blades 4. The method as set forth in claim 3 including the step of compacting the side turn portions within the predetermined slots.

5. A method for inserting insulators and side turn portions of at least one electrical coil formed of conductor wire into selected axially extending slots of a magnetic core having axially extending slot entrances in communication with a periphery of the magnetic core, said method comprising: placing insulators into axially extending guide apertures aligned to correspond with the axially extending slots of the magnetic core; positioning the coil turns in curved turn-receiving gaps of a coil-inserting apparatus, each of said curved turn-receiving gaps having axially extending slits aligned to correspond with the slot entrances of a selected pair of slots of the magnetic core and thereby aligning said turn portions in said turn-receiving gaps to correspond with the selected pair of slots for insertion therein; effecting a first movement of said coil-inserting device adjacent the periphery of the magnetic core with the axially extending slits being aligned with the slot entrances, and pushing said turns into selected pairs of the axially extending slots of the magnetic core while concurrently pushing the insulators into the slots, said insulators being pushed in a direction opposite to the axial direction in which they were initially placed into said axially extending guide apertures.

6. The method of claim 5 including the step of compacting said turns within the selected pairs of slots and concurrently pushing said insulators into the selected axially extending slots over the compacted turn portions in said slots.

7. A method of inserting side turn portions of a group of electrical coils formed of conductor wire into predetermined slots of a core having slot entrances in communication with a periphery of the core, the method comprising the steps of: placing coil turns in turn-receiving gaps formed between relatively movable members of an inserting apparatus; establishing entrance extensions for predetermined ones of the slot entrances by positioning the turn-receiving gaps and the slot entrances in the vicinity of one another while inserting part of the side turn portions into the predetermined slots in a generally axial manner; and temporarily placing at least some of the side turn portions of the group of electrical coils in a stored position adjacent the core periphery in the slot entrance extensions defined by the turn-receiving gaps by effecting relative axial movement between the core and at least some of the relatively movable members; and thereafter transferring said at least some of the side turn portions of the group of electrical coils from the stored position into the slot entrances.

8. The method set forth in claim 7 further including, during the step of inserting a part of the side turn portions into the predetermined slots, advancing a part of the end turn portions of the group of electrical coils through the predetermined slots.

9. The method of claim 7 including, as transferring said at least some of the side turn portions of the group of electrical coils is accomplished, forcing side turn portions previously inserted in the predetermined slots into a compact mass within the predetermined slots.

10. A method of inserting side portions of a group of turns of electrical conductor wire into predetermined axially extending slots of a core of a given stack height within a preselected stack height range and having axially extending slot entrances in communication with a periphery of the core, by relatively moving blades of a coil inserting apparatus and the core, the method comprising the steps of: selectively setting an increment of relative travel of the blades and the core conforming to the stack height of the core; placing the turns in turn-receiving gaps associated with the blades and in alignment with predetermined ones of the slot entrances; and inserting the turn side portions into the predetermined slots by effecting the selected increment of relative travel of the blades and the core.

11. A method of inserting insulators and side portions of a group of turns of electrical conductor wire into predetermined axially extending slots of a core of a given stack height within a preselected stack height range and having axially extending slot entrances in communication with a periphery of the core, by relatively moving blades and insulator pushers of a coil inserting apparatus and the core, the method comprising the steps of: selectively setting an increment of separate movement of the insulator pushers to place the insulator pushers in a preselected position with respect to the blades, the preselected position being related to the core stack height, and an increment of relative movement of the core, blades and insulator pushers conforming to the stack height of the core; placing insulators in axially extending guide apertures aligned with predetermined ones of the axially extending slots and associated insulator pushers; placing the turns in turn-receiving gaps associated with the blades and in alignment with predetermined ones of the slot entrances; effecting the selected increment of separate movement of the insulator pushers; and inserting the turn side portions into predetermined slots and inserting the insulators into predetermined slots as the turn side portions are inserted by effecting the selected increment of relative travel of the core, blades and insulator pushers.

* * * * *